US008543766B2

(12) United States Patent
Grayson et al.

(10) Patent No.: US 8,543,766 B2
(45) Date of Patent: Sep. 24, 2013

(54) WRITING DATA TO SYSTEM MEMORY IN A DATA PROCESSING SYSTEM IN WHICH CACHE LINE STATES ARE TRACKED

(75) Inventors: Brian C. Grayson, Austin, TX (US); Wichaya T. Changwatchai, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 76 days.

(21) Appl. No.: 13/157,549

(22) Filed: Jun. 10, 2011

(65) Prior Publication Data
US 2012/0317367 A1 Dec. 13, 2012

(51) Int. Cl.
G06F 12/12 (2006.01)

(52) U.S. Cl.
USPC ..... 711/135; 711/143; 711/144; 711/E12.069

(58) Field of Classification Search
USPC .......... 711/118, 133, 135, 143, 144, E12.001, 711/E12.002, E12.023
See application file for complete search history.

(56) References Cited

U.S. PATENT DOCUMENTS

| 5,542,066 | A | * | 7/1996 | Mattson et al. | 711/136 |
|---|---|---|---|---|---|
| 5,895,488 | A | * | 4/1999 | Loechel | 711/135 |
| 6,327,643 | B1 | * | 12/2001 | Egan | 711/134 |
| 6,490,655 | B1 | * | 12/2002 | Kershaw | 711/133 |
| 6,684,302 | B2 | * | 1/2004 | Kershaw | 711/151 |
| 7,020,751 | B2 | * | 3/2006 | Kershaw | 711/143 |
| 7,069,388 | B1 | * | 6/2006 | Greenfield et al. | 711/133 |
| 8,001,331 | B2 | * | 8/2011 | Biles et al. | 711/133 |
| 8,060,700 | B1 | * | 11/2011 | Glasco et al. | 711/133 |
| 8,244,984 | B1 | * | 8/2012 | Glasco et al. | 711/133 |
| 2008/0244185 | A1 | * | 10/2008 | O'Krafka et al. | 711/135 |

OTHER PUBLICATIONS

Lee et al.; "DRAM-Aware Last-Level Cache Writeback: Reducing Write-Caused Interference in Memory Systems"; Apr. 2010; pp. 1-21; University of Texas at Austin; USA.
Amin et al.; "Rank-Aware Cache Replacement and Write Buffering to Improve DRAM Energy Efficiency"; ISLPED '10; Aug. 18-20, 2010; 6 Pgs; ACM.
Lee et al.; "Improving Bandwidth Utilization using Eager Writeback"; Journal of Instruction-Level Parallelism 3; 2001; pp. 1-22.
Lee et al.; "DRAM-Aware Last-Level Cache Replacement"; Dec. 2010; pp. 1-25; University of Texas at Austin; USA.

* cited by examiner

Primary Examiner — Edward Dudek, Jr.
Assistant Examiner — Ralph A Verderamo, III
(74) Attorney, Agent, or Firm — Joanna G. Chiu; Jonathan N. Geld

(57) ABSTRACT

A state indicator associated with a cache line is stored, wherein the cache line is one of a plurality of cache lines each associated with a corresponding unique section of a region of system memory. The state indicator comprises a dirty indication indicating that the cache line is a candidate for writing data stored in the cache line to the associated section of the region of system memory. The state indicator is one of a plurality of state indicators each associated with a corresponding cache line. For the region of system memory, a number of the plurality of state indicators that comprises the dirty indication is determined, and if a threshold is exceeded, data stored in a selected cache line is written to the associated section of the region of system memory, and a clean indication is stored in the state indicator corresponding to the cache line.

18 Claims, 7 Drawing Sheets

WRITING DATA TO SYSTEM MEMORY IN A DATA PROCESSING SYSTEM IN WHICH CACHE LINE STATES ARE TRACKED

BACKGROUND

1. Field

This disclosure relates generally to data processing systems, and more specifically, to writing data back to system memory within a data processing system.

2. Related Art

In a typical multiprocessor system, in which multiple processors are accessing a shared system memory, data is written to memory in a time-interleaved fashion. This may result in non-optimal performance. For example, in the case of a dual data rate (DDR) memory, each time data is written to a different page of a memory bank, additional page-opens and page-closes must be performed, decreasing overall system performance.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Memory accesses to a same region of memory may help reduce delays incurred with having to continuously access different regions. For example, in the case of a DDR memory, each time a row conflict occurs, in which a current row has to be closed and a new one activated or opened, a delay is incurred for each of the closing and opening of a row. Therefore, in one embodiment, memory accesses to regions of system memory are tracked to determine when a number of dirty cache lines corresponding to a same region of memory has reached a predetermined threshold. Upon reaching this threshold, those dirty cache lines which correspond to a same region can be cleaned by writing the updated cache data to system memory. Since these dirty cache lines correspond to a same region, continuous closing and opening of new regions is not needed while performing the clean. Therefore, while a delay may be incurred on a first access of a clean process which cleans a set of dirty cache lines corresponding to a same region, subsequent accesses of the clean process do not incur additional delay. In this manner, performance of a system may be improved.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
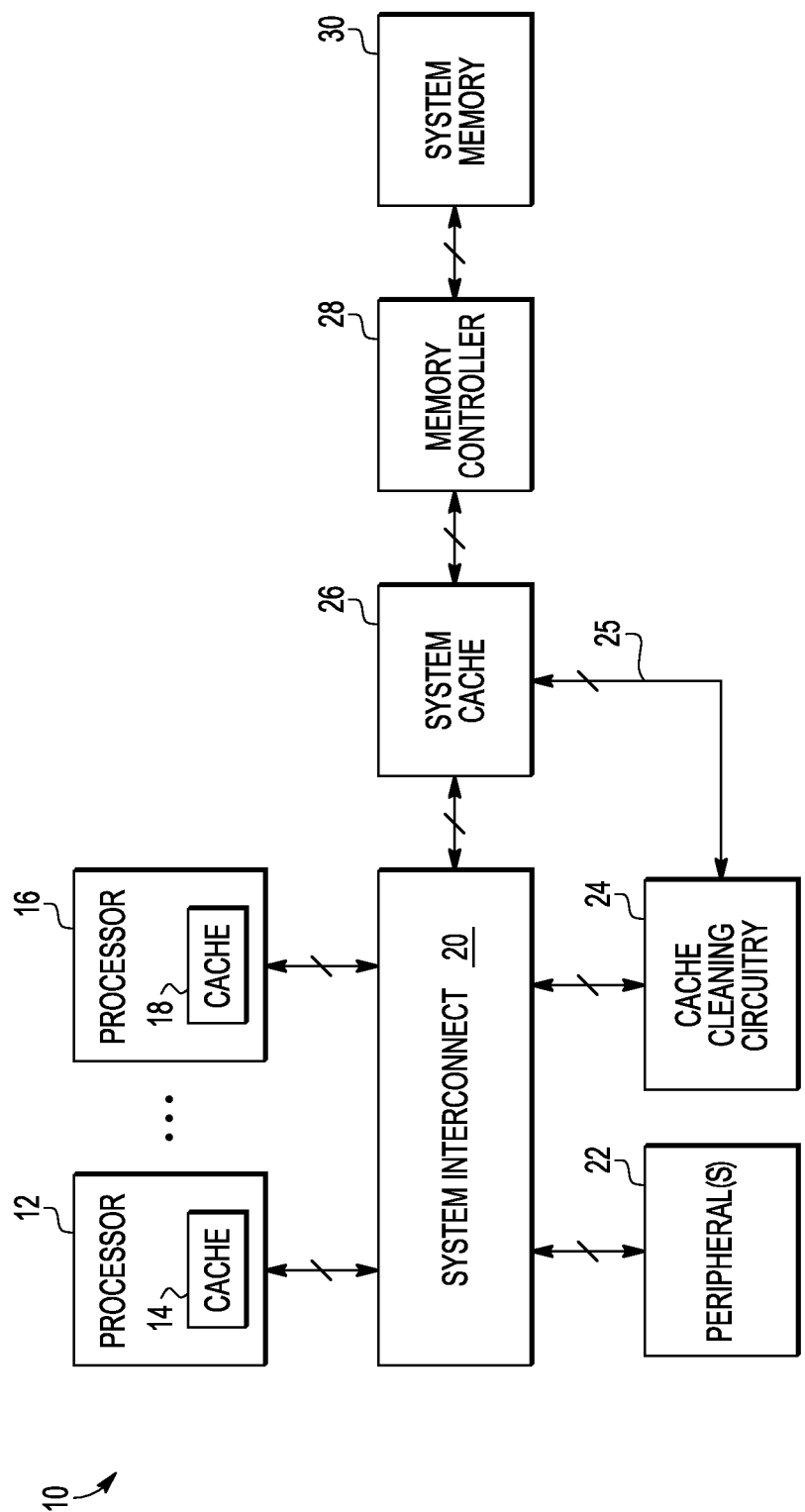
FIG. 1 illustrates, in block diagram form, a data processing system in accordance with one embodiment of the present invention.

Illustrated in FIG. 1, in block diagram form, is a data processing system 10 having a processor 12, a processor 16, a system interconnect 20, peripheral(s) 22, cache cleaning circuitry 24, a system cache 26, a memory controller 28, and a system memory 30. Each of processor 12, processor 16, peripheral(s) 22, cache cleaning circuitry 24, and system cache 26 is bidirectionally coupled to system interconnect 20. System cache 26 is also bidirectionally coupled to cache cleaning circuitry 24 via conductor 25, outside of system interconnect 20. Memory controller 28 is bidirectionally coupled to each of system cache 26 and system memory 30. Data processing system 10 may include only one processor, such as processor 12, or may include any number of processors. Peripheral(s) 22 may include any number and type of peripherals, or, alternatively, data processing system 10 may not include any other peripherals. Each of processors 12 and 16 may also include its own dedicated cache, such as cache 14 and 18, respectively. System interconnect is a global interconnect. In one form, it is a system bus. However, other forms of interconnect may be used such as, for example, an interconnect fabric, crossbars, point-to-point connections, etc.

In operation, multiple masters coupled to system interconnect 20, such as processors 12 and 16 or peripherals 22, may access system memory 30 for reading and writing data. Accesses to system memory 30 are controlled by memory controller 28 and gated by system cache 26. That is, in the illustrated embodiment, accesses to system memory 30 are first provided via system cache 26. In one embodiment, cache cleaning circuitry 24 monitors the writes performed by these masters to system memory 30 and determines, based on the monitoring, when a flush or clean of the system cache 26 can be performed. That is, rather than waiting for a flush or clean of system cache 26 to occur according to its own cache allocation policy, cache cleaning circuitry 24 may, based on the tracking of accesses to system memory 30, determine that a flush or clean of certain cache lines should occur prior to when it would according to the cache allocation policy. In an alternate embodiment, system cache 26 may not be present, such that writes occur directly to system memory 30 via system controller 30. In this case, cache cleaning circuitry 24 monitors writes performed by the masters to system memory 30 and determines, based on the monitoring, when a flush or clean of caches 14 or 18 can be performed.

Figure 2:
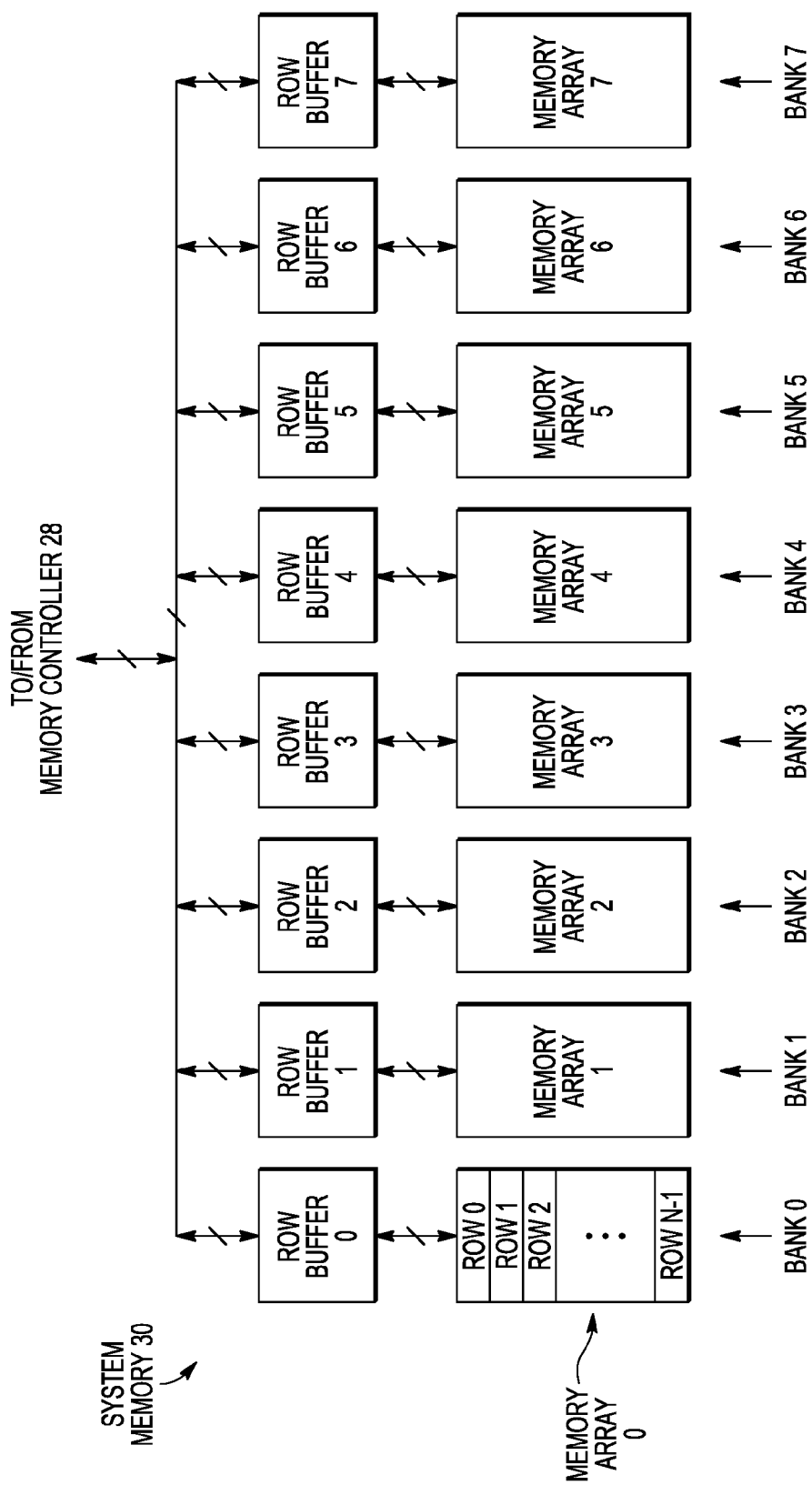
FIG. 2 illustrates, in block diagram form, the system memory of FIG. 1 in accordance with one embodiment of the present invention.

System memory 30 may be any type of system memory accessible via system interconnect 20. In one embodiment, system memory 30 is a dual data rate (DDR) memory. For example, FIG. 2 illustrates, in block diagram form, system memory 30 as a DDR memory. The illustrated DDR memory of FIG. 2 includes 8 banks of memory, bank 0-bank 7. Each bank includes a corresponding row buffer and a corresponding memory array which stores N rows of data. For example, bank 0 includes row buffer 0 and memory array 0, bank 1 includes a row buffer 1 and a memory array 1, bank 2 includes a row buffer 2 and a memory array 2, bank 3 includes a row buffer 3 and a memory array 3, bank 4 includes a row buffer 4 and a memory array 4, bank 5 includes a row buffer 5 and a memory array 5, bank 6 includes a row buffer 6 and a memory array 6, and bank 7 includes a row buffer 7 and a memory array 7. Each memory array includes N rows of data (wherein a row of data may also be referred to as a page of data, such that each memory array includes N pages of data). Therefore, referring to memory array 0 of bank 0 as an example, memory array 0 includes N rows of data, row 0-row N−1.

Still referring to FIG. 2, the row buffers each operate as a one entry cache for each bank such that all accesses to the banks are performed to and from memory controller 28 by the row buffers. For example, to access row 2 of memory array 0, row 2 gets "activated" (stored into row buffer 0) so that it may be accessed via memory controller 28. If an access needs to be made to a different row of memory array 0, then row 2 must first be "closed" (stored back to memory array 0) and the new row is activated (stored into row buffer 0). Each time a row is closed or activated, a delay is incurred. For example, if the row buffer being accessed is empty, a row miss occurs upon accessing the bank and a delay is incurred to activate a row. In the case of a row conflict (in which a row is currently stored in a row buffer, but a new one needs to be accessed), a delay is incurred for both closing the current row and opening a new row. In one embodiment, each row stores 8 kilobytes (KB) of data, and thus, each row buffer also stores 8 KB of data. In one embodiment, each bank includes 16,384 rows, for a total of 131,072 rows in system memory 30. Note that if accesses are made to the same row of data of a bank (in which a row hit occurs in the row buffer each time), then less delay is incurred since the current row need not be closed and a new row activated. Furthermore, once a row is activated, multiple accesses to different locations within that same row can be made in a pipelined fashion, further reducing delay. In the illustrated embodiment, each byte in system memory 30 is independently addressable by the masters of system 10. Therefore, accesses to different banks may be made with each access to system memory 30 by memory controller 28; however, each time access is made to a row of a bank that is currently open or active (and thus stored within the corresponding row buffer), further delay may be avoided.

Figure 3:
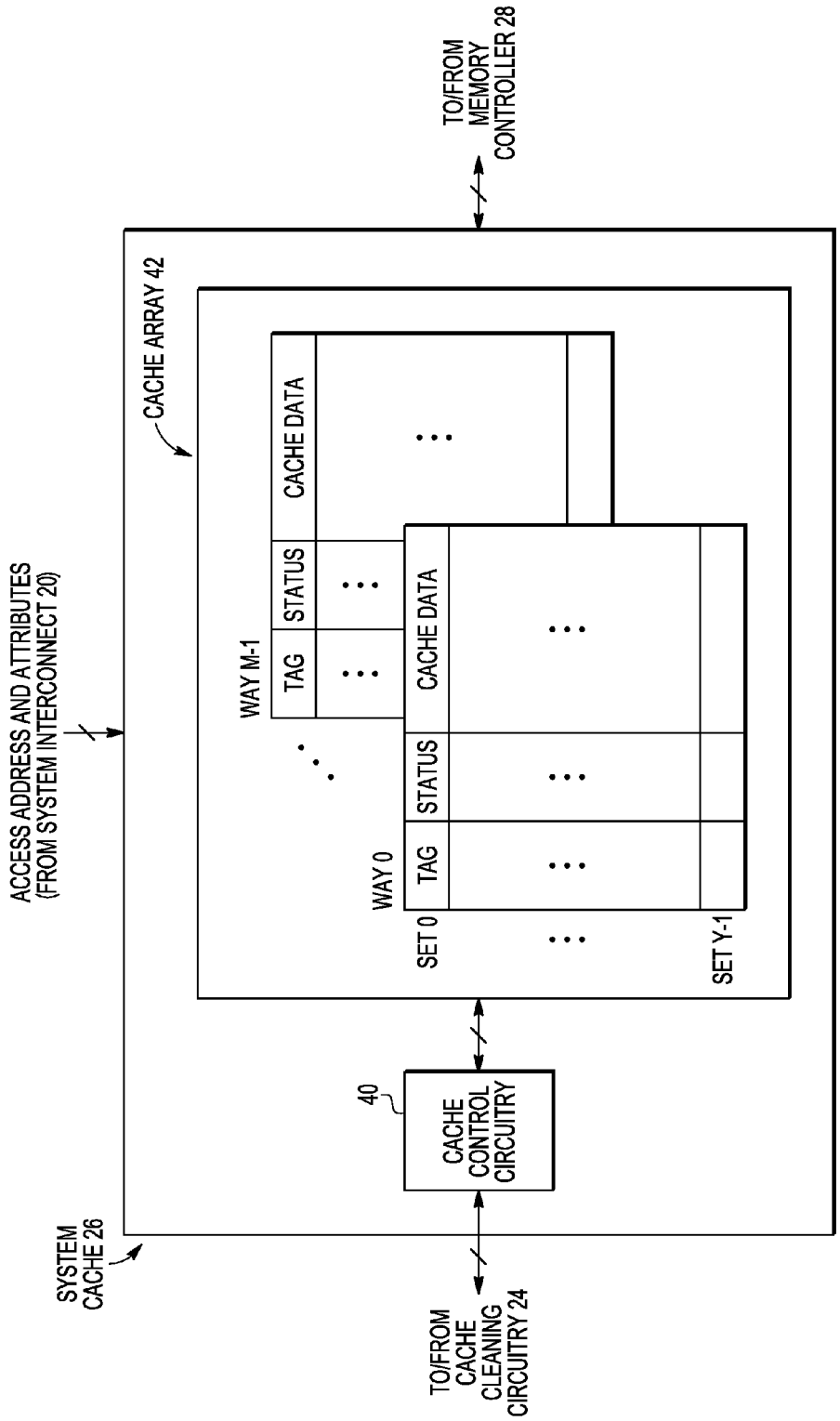
FIG. 3 illustrates, in block diagram form, the system cache of FIG. 1 in accordance with one embodiment of the present invention.

FIG. 3 illustrates, in block diagram form, system cache 26 in accordance with one embodiment of the present invention. System cache 26 includes cache control circuitry 40 and a cache array 42 bidirectionally coupled to cache control circuitry 40. Cache control circuitry 40 may communicate with cache cleaning circuitry 24 directly via conductor 25 or may communicate with cache cleaning circuitry 24 via system interconnect 20. System cache 26 receives an access address and corresponding access attributes from system interconnect 20, and system cache 26 also provides/receives information to/from memory controller 28. In the illustrated embodiment, system cache 26 is a multi-way set-associative cache. Cache array 42 includes Y sets (set 0-set Y−1), each set having M ways (way 0-way M−1). A cache line of cache array 42 refers to an intersection of a way and a set. Each cache line stores a tag, status information, and cache data. The status information may include, for example, a valid bit to indicate whether or not the line is valid and a dirty bit, D, to indicate whether or not the line is coherent with system memory 30. For example, a dirty cache line is one whose data differs from what is stored in system memory 30. The status information may include additional bits as well.

In operation, for each received access address, system cache 26 determines if a hit or miss occurs in cache array 42. For example, the received access address includes a tag portion and an index portion. The index portion is used by cache control circuitry 40 to indicate a particular set (one of set 0 to set Y−1), and cache control circuitry 40 compares the tag portion to each way of the cache and uses the result of this comparison (as well as the corresponding status information) to determine if there has been a cache hit or a cache miss. For example, even if the tag results in a match, the cache line may be an invalid cache line, thus resulting in a miss. Cache control circuitry 40 also controls the allocation policy of system cache 26. For example, the allocation policy may used to indicate which cache line in cache array 42 should be selected for replacement with a new cache line when there is a need or desire to store a new cache line (such as, for example, in the case of a cache miss). Also, each set may include bits related to the cache allocation policy. If the cache line identified by cache control circuitry 40 for replacement is a dirty cache line, it is first flushed to memory. As used herein, a flush of a cache line refers to updating the corresponding location in the corresponding memory (system memory 30 in this example), if needed (such as if the cache line is dirty or incoherent with memory), and invalidating the cache line. Also, as used herein, a clean of a cache line refers to updating the corresponding location in the corresponding memory (system memory 30 in this example), if needed (such as if the cache line is dirty or incoherent with memory). With a clean, the cache line is not invalidated. Note that the term "clean" may be used to refer to cleaning or flushing, depending on the embodiment. In one embodiment, system cache 26, which corresponds to system memory 30, includes 16,384 cache lines. Note that cache control circuitry 40 may also perform other functions, as needed, for system cache 26.

As will be described below, cache control circuitry 40 also receives a cache clean request signal from cache cleaning circuitry 24 (either via system interconnect 20 or directly via conductor 25). In response to assertion of this cache clean request signal, cache control circuitry 40 either flushes or cleans the cache lines of system cache 26 which are indicated by cache cleaning circuitry 24. As will be described in more detail below, a flush may be performed if the cache lines are to be invalidated as part of the clean process, or, if it is likely that the same cache line may later be accessed by a master of system 10, then a clean of the indicated cache lines may be performed such that system memory 30 is updated, as needed, but the cache lines remain as valid entries of system cache 26. This clean may or may not affect the cache allocation policy.

Figure 4:
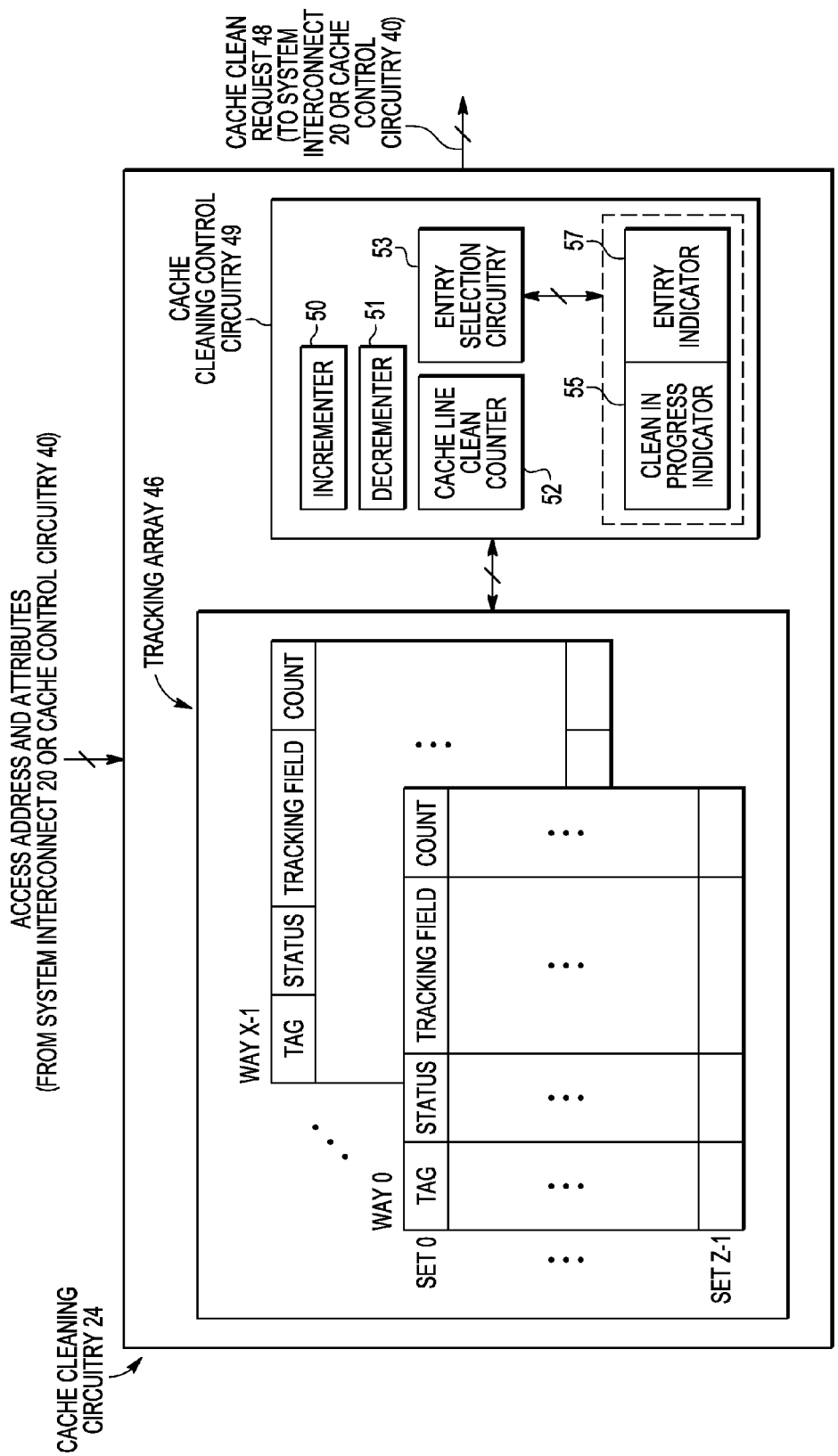
FIG. 4 illustrates, in block diagram form, the cache cleaning circuitry of FIG. 1 in accordance with one embodiment of the present invention.

FIG. 4 illustrates, in block diagram form, an example of cache cleaning circuitry 24. Cache cleaning circuitry 24 includes a tracking array 46 and cache cleaning control circuitry 49 bidirectionally coupled to tracking array 46. Cache cleaning circuitry 24 also receives the access address and corresponding access attributes from system interconnect 20

(or may receive these directly from cache control circuitry 40 via conductor 25). Cache cleaning circuitry provides a cache clean request signal 48 to cache control circuitry 40. Tracking array 46 includes Z sets (set 0-set Z–1), in which each set includes X ways (way 0-way X–1). The intersection of a set and a way provides a tracking array entry. Each tracking entry of tracking array 46 includes a tag, status information, a tracking bitfield, and a count value. Each set may also include data related to the replacement policy for that set, which cache cleaning control circuitry 49 may use to determine which entry within tracking array 46 to replace during allocation of a new entry. Cache cleaning control circuitry 49 includes an incrementer 50, which may be used to increment the count values stored in tracking array 46 by a predetermined value, such as one, and a decrementer 51, which may be used to decrement the count values stored in tracking array 46 by a predetermined value, such as one. Cache cleaning control circuitry 49 also includes a cache line clean counter 52, entry selection circuitry 53, a clean in progress indicator 55, and an entry indicator 57. Entry selection circuitry 53 is bidirectionally coupled to clean in progress indicator 55 and entry indicator 57. Note that any of the information stored in cache cleaning control circuitry 49 may be communicated with cache control circuitry 40 (either directly or via system interconnect 20) as needed.

In operation, cache cleaning circuitry 24 monitors the accesses to system memory 30 and groups accesses for a particular region of memory together. In one embodiment, a particular region of memory refers to a particular row of system memory 30, as illustrated in FIG. 2. By way of tracking array 46, cache cleaning circuitry 24 can track which cache lines of system cache 26 (or of specific processor caches 14 and 18) which are candidates for being cleaned (e.g. dirty cache lines) correspond to the same tracked region. Upon a certain number of dirty cache lines corresponding to a same tracked region being achieved, cache cleaning circuitry 24 can request cache control circuitry 40 of system cache 26 to clean or flush these cache lines, either all together or in subgroups. Since these cache lines all correspond to a same region (i.e. a same row in this example), access to system memory 30 performed during the flush or clean of the cache lines is improved. That is, the particular row being accessed need only be activated or opened once for a series of flushes or cleans to be performed. Similarly, if system cache 26 is not present, cache cleaning circuitry 24, upon a certain number of dirty cache lines corresponding to a same tracked region being achieved, can request the caches of the processors (such as cache 14 and/or 18) to flush or clean its cache lines which correspond to the selected tracked region. This may be done, for example, by broadcasting a flush or clean command to the masters, such as processor 12 and 16. Operation of cache cleaning circuitry 24 will be further described in reference to FIGS. 5-8.

Figure 5:
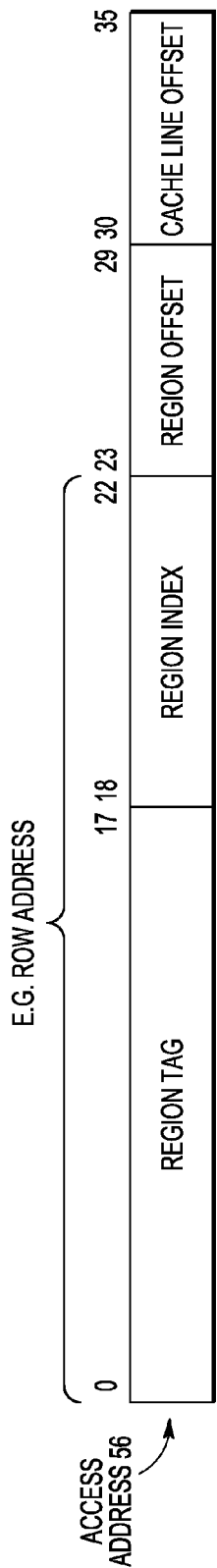
FIG. 5 illustrates, in diagrammatic form, an access address provided within the data processing system of FIG. 1 in accordance with one embodiment of the present invention.

FIG. 5 illustrates, in diagrammatic form, the various portions of an access address 56 in accordance with one embodiment of the present invention. In FIG. 5, access address 56 is parsed into multiple portions, where a first portion provides a region tag (e.g. bits 0-17 of access address 56), a second portion provides a region index (e.g. bits 18-22 of access address 56), a third portion provides a region offset (e.g. bits 23-29 of access address 56), and a fourth portion provides a cache line offset (e.g. bits 30-35 of access address 56). Note that in this embodiment, the region index corresponds to the set index in tracking array 46. In this embodiment, a 5-bit region index corresponds to 32 sets per way in tracking array 46. Note that, in the example of system memory 30 being a DDR as illustrated in FIG. 2, the region tag and region index together correspond to a row address within system memory 30. That is, it addresses a full row of memory 30, in which each row of memory 30 corresponds to a region that can be tracked by cache cleaning circuitry 24. Furthermore, the region offset identifies a portion of data (e.g. a cache line's worth of data) within the addressed row. For example, each row in system memory 30 is addressable by the region tag and region index together. Then, within the row itself, the region offset may be used to identify a portion of the row.

Figure 6:
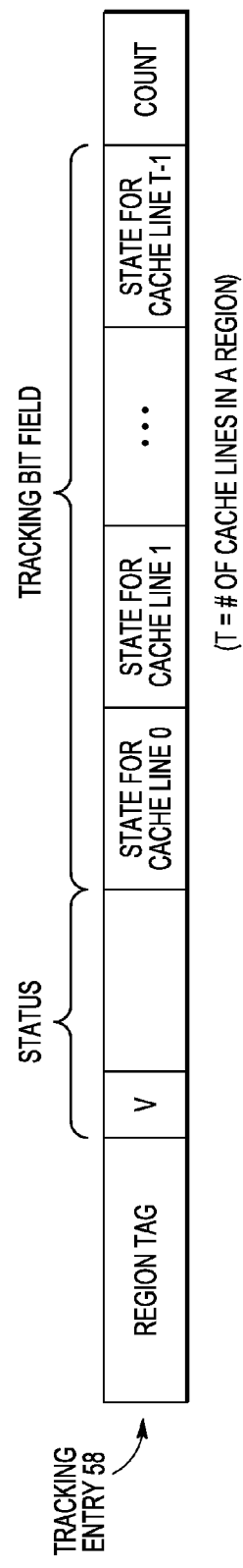
FIG. 6 illustrates, in diagrammatic form, a tracking entry of the cache cleaning circuitry of FIG. 1 in accordance with one embodiment of the present invention.

FIG. 6 illustrates, in diagrammatic form, an example tracking entry 58 of tracking array 46. The description of tracking entry 58 applies to each entry of tracking array 46. Each tracking entry stores a region tag which, along with the region index given by the tracking array 46 set index, indicates the region that tracking entry 58 is tracking. In the current example, this region corresponds to a particular row of system memory 30. The status information includes a valid bit to indicate whether or not the tracking entry is valid and may include other information as well, such as a replacement state. That is, cache cleaning control circuitry 49 may use the replacement state of each entry to determine which entry within tracking array 46 to replace. Tracking entry 58 also includes T "state for cache line" fields (which may also be referred to as state indicators): state for cache line 0 to state for cache line T–1, where T represents the number of cache lines needed to store an entire region. In the current example, 128 cache lines (each cache line having a length of 64 bytes) is needed to store a region of 8 KB (corresponding to one row of system memory 30, such as, for example, row 0 of bank 0). Therefore, for this example, tracking entry 58 includes 128 state for cache line fields: state for cache line 0 to state for cache line 127. In one embodiment, each state for cache line field includes a single bit which indicates whether or not the corresponding cache line is dirty or not. If so, then the single bit has a value (e.g. a logic level one) which indicates it is dirty or incoherent with memory. If not, then the single bit has a value (e.g. a logic level zero) which indicates it is not dirty (i.e. clean or coherent with memory). This bit may also be referred to as a write indication which indicates whether the corresponding cache line is a candidate for writing data stored in the cache line to a unique section of memory. For example, a cache line may be a candidate for writing data to memory 30 if it is dirty. In alternate embodiments, the write indicator portions of the state indicator may be any number of bits. Tracking entry 58 also includes a count value which counts how many of the state for cache line fields indicate a dirty cache line (or a cache line that is a candidate for being stored to memory).

Therefore, in the case of system cache 26 being monitored, a state for cache line bit of tracking entry 58 having a logic level 1 indicates that the corresponding cache line in system cache 26 is dirty. In the case that a cache of each processor is being tracked rather than system cache 26 (such as in the case that there is no system cache), each state for cache line field may include one or more bits to indicate whether the cache line is dirty or not, as described above, and would also include an identifier field to indicate which cache the cache line corresponds to. For example, it may be a processor identifier to identify cache 14 or 18. Even without system cache 26, the identifier field may not be needed if, for example, system interconnect 20 can broadcast information to all masters.

Therefore, for a received access address, as was described in the example of FIG. 5, the region tag and region index identify a particular region (e.g. row) of system memory 30. In this example, the region offset is a 7-bit value which provides which cache line's worth of data (which 64 byte unique section) of the particular row is being accessed. This region offset can therefore be used to indicate which state for cache line field within the tracking bitfield is to be modified as needed. For example, a region offset of 0 identifies a first 64 byte unique section of a row, and state for cache line 0 can be used to indicate whether a cache of system 10 (such as system cache 26) stores a dirty version of this 64 byte section or not. A region offset of 5 identifies a sixth 64 byte unique section of the row, and state for cache line 5 can be used to indicate whether a cache of system 10 (such as system cache 26) stores a dirty version of this 64 byte section or not. Therefore, the count value, which keeps track of how many state for cache line fields indicate a dirty cache line, represents how much of a particular region (e.g. row) in memory 30 contains old (i.e. incoherent) data. In one embodiment, tracking array 46 includes 256 tracking entries which allows for 256 regions to be tracked. For example, this would allow 256 rows of system memory 30 to be tracked.

Figure 7:
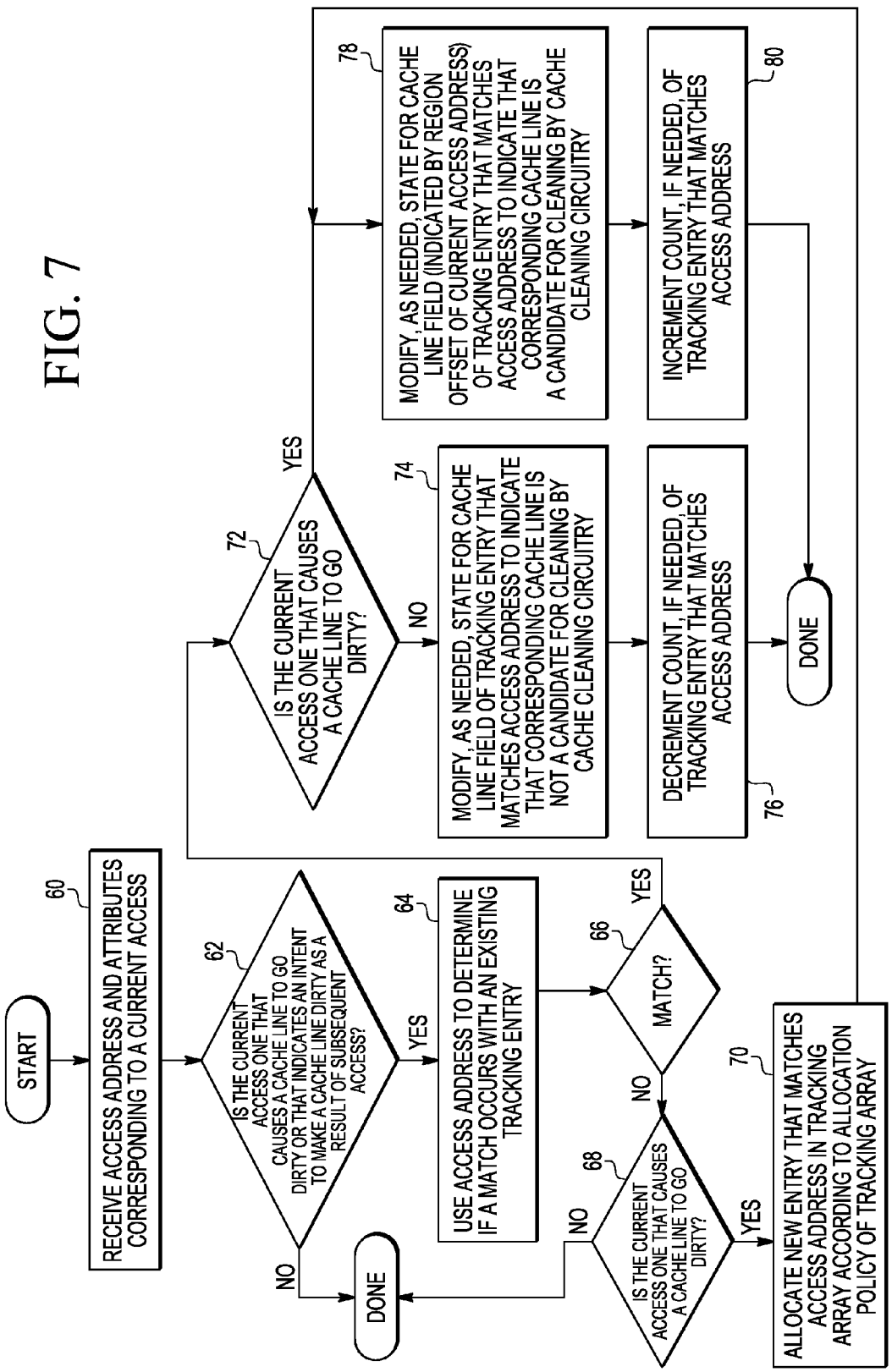
FIG. 7 illustrates, in flow diagram form, a method of updating the cache cleaning circuitry of FIG. 1 in accordance with one embodiment of the present invention.

FIG. 7 illustrates, in flow diagram form, a method for updating cache cleaning circuitry 24 in accordance with one embodiment of the present invention. The flow of FIG. 7 begins with block 60 in which an access address and attributes corresponding to a current access to system memory 30 are received. This access can be from any master in system 10. Flow proceeds to decision diamond 62 in which it is determined if the current access is one that causes a cache line within system 10 to go dirty or is one that indicates an intent to make a cache line dirty as a result of a subsequent access. For example, a current access which is one that causes a cache line to go dirty may be a write with cast out (WCO) access, a write with invalidate (WWI) access, a write with flush (WWF) access, a write with clean (WWC) access, a write with merge (WWM) access, a write with by enables (WBE) access, or an atomic statistics (WRITEU/READU/NOTIFY) access. These types of accesses are those that will result in a cache line being dirty, i.e. incoherent with system memory 30, as a result of the access itself. A current access which is one that indicates an intent to make a cache line dirty as a result of a subsequent access is one that will likely result in a future access resulting in a dirty cache line. For example, these types of accesses may include a read with intent to modify (RWITM) access, a claim to replace (CTR) access, or a claim to modify (CTM) access. For example, a RWITM access is a read and thus will not itself result in a cache line being updated and thus be made dirty, but since it is performed with an intent to modify, it is highly likely that the data being read will be modified. Therefore, upon a subsequent write access of the modified data, the modified data will be cached, thus resulting in a dirty cache line.

Therefore, referring back to decision diamond 62, if the current access is either one that causes a cache line to go dirty or one that indicates an intent to make a cache line dirty as a result of a subsequent access, flow proceeds to block 64. However, if the current access is neither one of these types of accesses, then flow proceeds to done. In block 64, the access address is used by cache cleaning control circuitry 49 to determine if a match occurs with an existing tracking entry of tracking array 46. That is, the region tag and region index of the current access address is used to determine if a match exists in tracking array 46 where the region index indicates a set of set 0 to set Z−1 of tracking array 46, and the region tag is used to determine if one of the tags of way 0 to way X−1 in the indicated set results in a match. Flow then proceeds to decision diamond 66 in which it is determined if a match occurs. If no match occurs, then the current region (e.g. row) being accessed by the current access address is not currently being tracked by cache cleaning circuitry 24. Therefore, if no match occurs, flow proceeds to decision diamond 68 in which it is determined if the current access is one that causes a cache line to go dirty. If so, flow proceeds to block 70 in which a new entry which matches the access address is allocated in tracking array 46 according to the allocation policy of tracking array 46 implemented by cache cleaning control circuitry 49. For example, a policy such as a pseudo least recently used (PLRU) algorithm may be used to select an entry within tracking array 46 to cast out and replace with the current access address such that the corresponding region being accessed can now be tracked. Returning to decision diamond 68, if the current access is one that indicates an intent to make a cache line dirty as a result of a subsequent access, then flow proceeds to done since it is not necessary to allocate a new entry in tracking array 46 yet, since the current access will not actually cause a cache line to go dirty. Instead a new entry can be allocated or an existing entry modified when the subsequent access occurs which does actually cause a cache line to go dirty. After block 70, flow proceeds to block 78.

Referring back to decision diamond 66, if a match does occur, this indicates that the region being accessed by the current access address is already being tracked by tracking array 46 and thus has a corresponding tracking entry in tracking array 46 (i.e. the tracking entry which resulted in the match) and flow proceeds to decision diamond 72. In decision diamond 72, it is determined if the current access is one that causes a cache line to go dirty. If so, flow proceeds to block 78 in which the state of cache line field (which is indicated by the region offset of the current access address) of the tracking entry that matches the access address is modified, as needed, to indicate that the corresponding cache line is a candidate for cleaning by cache cleaning circuitry 24. A cache line is a candidate for cleaning when it holds data that is dirty or incoherent with system memory 30 or is unlikely to be accessed again within a reasonable number of accesses. In these cases, it is desirable to update system memory 30 to reflect the updated data stored in the cache (such as system cache 26). As will be described below, this can be done with a clean process in which the cache line is either flushed to system memory 30 or is cleaned (in which the cache line is updated to memory, but not yet invalidated). The modification of the corresponding state for cache line field indicated by the region offset may include setting the bit to a logic level 1 if it is not already a logic level 1 to indicate it is now dirty data. Therefore, if the bit is already a logic level 1, meaning the cache line is still dirty as a result of a previous access, it need not be set again and can be left unmodified. Flow then proceeds to block 80 in which the count of the tracking entry that matches the access address is incremented as needed. For example, if the bit was not yet a logic level 1 and it was modified to be a logic level 1, then incrementer 50 in cache cleaning control circuitry 49 may be used to increment the count value by 1 to indicate that another cache line associated with a unique section of the corresponding region being tracked is dirty and thus ready to be cleaned (e.g. written to system memory 30). However, if the bit was already a logic level 1, then the count need not be incremented because this dirty cache line has already been accounted for in the current count value (when the corresponding state for cache line field was previously modified from a logic level 0 to 1). Flow then proceeds to done.

Referring back to decision diamond 72, if the current access is not one that causes a cache line to go dirty (indicating that it is instead one that indicates an intent to make a cache line dirty as a result of a subsequent access), flow proceeds to block 74. In block 74, the state of cache line field (which is indicated by the region offset of the current access address) of the tracking entry that matches the access address is modified, as needed, to indicate that the corresponding cache line is not a candidate for cleaning by cache cleaning circuitry 24. In this case, since the access is one that is likely to result in making a cache line dirty as a result of a subsequent access, it would be useless to clean the cache line by flushing it or writing it back to system memory 30. That is, since this address location is likely to be modified shortly, it would be best to keep it in the cache and not yet update system memory 30. The modification of the corresponding state for the cache line field indicated by the region offset may depend on the current state of the bit. If the bit is currently at a logic level 1, then the modification may be to clear the bit to indicate that the line should not yet be cleaned (e.g. written to memory). If the bit is currently already at a logic level 0, then the bit need not be cleared again and can be left unmodified. Flow then proceeds to block 76 in which the count of the tracking entry that matches the access address is decremented as needed. For example, if the bit was not yet a logic level 0 and it was modified to be a logic level 0, then decrementer 51 in cache cleaning control circuitry 49 may be used to decrement the count value by 1 to indicate that one cache line fewer is ready for cleaning. However, if the bit was already a logic level 0, then the count need not be decremented. Flow then proceeds to done.

Therefore, the flow of FIG. 7 is used to set up tracking entries which correspond to new regions of system memory 30 being tracked and to selectively modify those tracking entries which correspond to regions already being tracked. The count field provides an indication of how many cache lines corresponding to a region being tracked are candidates for being cleaned (e.g. written to system memory 30). In one embodiment, cleaning includes cleaning the corresponding cache line from the cache in which it resides. For example, in the case in which system cache 26 is present, this may include cleaning the corresponding cache line from system cache 26. If system cache 26 is not present, cleaning may include cleaning the corresponding cache line from one of the caches which reside in one of the processors. In one embodiment, cleaning may include cleaning the corresponding line from one of the caches which resides in one of the processors as well as from system cache 26. Cleaning may include flushing the data from the corresponding cache line to system memory 30 in which the flushed cache line is also invalidated or may include cleaning the cache line by updating system memory 30 with the updated cache line data, but without invalidating the cache line.

Figure 8:
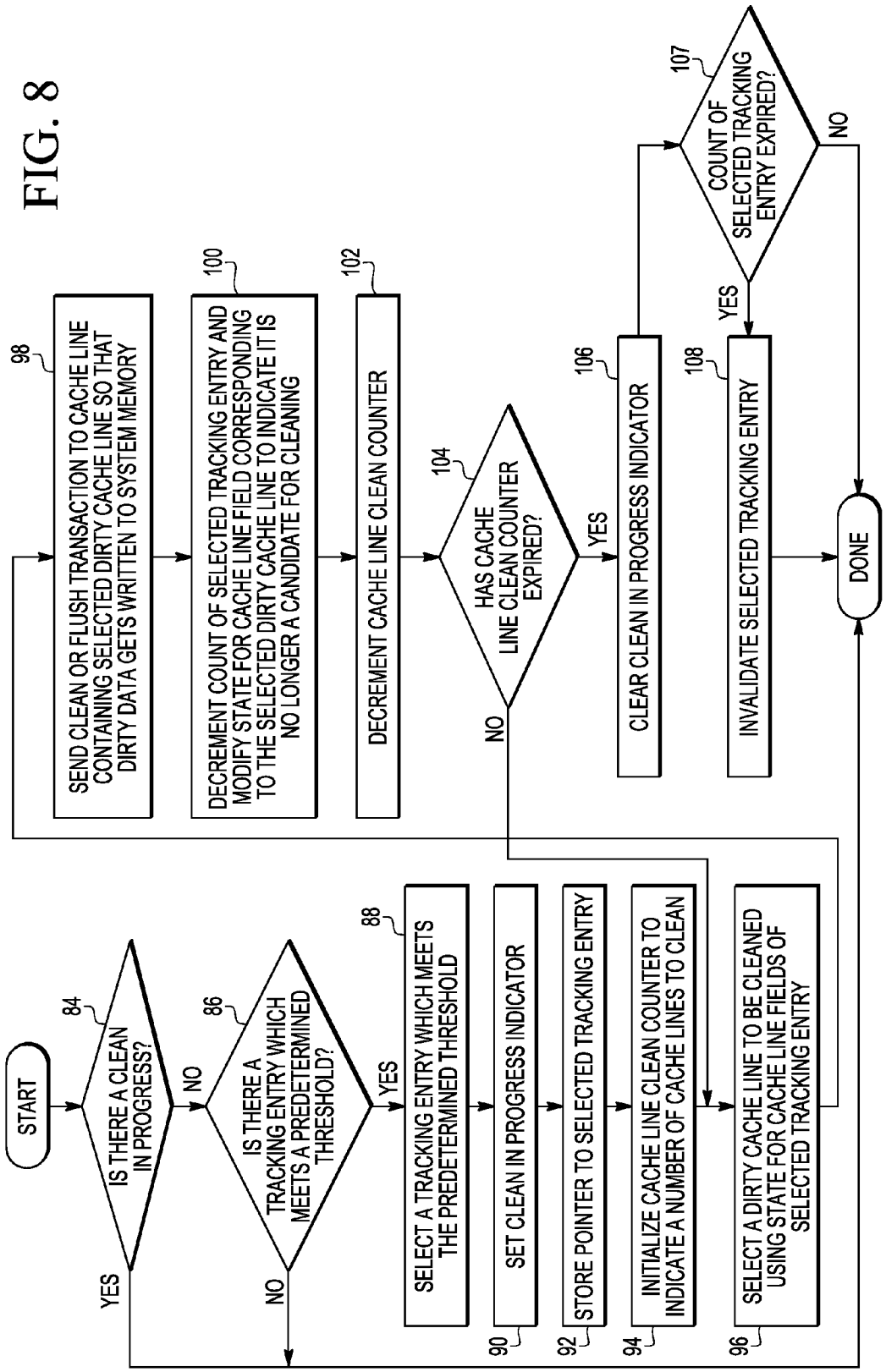
FIG. 8 illustrates, in flow diagram form, a method of performing a cache clean in accordance with one embodiment of the present invention.

FIG. 8 illustrates, in flow diagram form, a method for using tracking array 46 to perform cache cleans in accordance with one embodiment of the present invention. Flow begins with decision diamond 84 in which it is determined if there is a clean in progress. In one embodiment, clean in progress indicator 55 stored within cache cleaning control circuitry 49 may be used to indicate whether or not there is a clean in progress. If, at decision diamond 84, there is already a clean in progress, then flow proceeds to done. If there is no clean currently in progress, flow proceeds to decision diamond 86 where it is determined if there is a tracking entry within tracking array 46 whose count value meets or exceeds a predetermined count threshold. For example, cache cleaning control circuitry 49 can monitor the entries of tracking array 46 and, with each clock cycle, may perform a comparison of each count field with a predetermined count threshold to identify possible candidates for cleaning. In one embodiment, the predetermined count threshold may be 8, in which a tracking entry is a candidate for cleaning when at least 8 of its state for cache line fields indicate a cache line being ready for cleaning (e.g. indicating a dirty cache line). Therefore, if there is no tracking entry which meets the threshold, flow proceeds to done. However, if there is at least one tracking entry which meets the threshold, flow proceeds to block 88 in which a tracking entry which meets the predetermined threshold is selected. That is, if there is more than one entry whose count meets the threshold, cache cleaning control circuitry 49 can use any criteria to select one entry. Flow proceeds to block 90 in which clean in progress indicator 55 is set to indicate that a clean is now in progress. Flow then proceeds to block 92 in which a pointer to the selected tracking entry of tracking array 46 is stored in entry indicator storage circuitry 57 in cache cleaning control circuitry 49. Flow then proceeds to block 94 in which cache line clean counter 52 within cache cleaning control circuitry 49 is initialized to indicate a number of cache lines to be cleaned. For example, in one embodiment, if all dirty cache lines indicated by the tracking bitfield of the selected tracking entry are to be cleaned, the cache line clean counter may be set to the count value of the selected tracking entry. If, however, only a subset number of cache lines is to be cleaned, the cache line clean counter can be initialized to this value. For example, in one embodiment, cache lines may be cleaned in groups of 4 or groups of 8 for each clean process. After initializing cache line clean counter 52, flow proceeds to block 96 in which a dirty cache line needing to be cleaned is selected using the state for cache line fields in the tracking bitfield of the selected tracking entry. For example, the dirty cache lines can be selected by scanning the tracking bitfield, starting at state for cache line 0 field and progressing through the state for cache line fields until a logic level one is found. Alternate embodiments may use different methods to select those cache lines to be cleaned based on the tracking bitfield of the selected tracking entry.

After a dirty cache line is selected according to the state for cache line fields, flow proceeds to block 98 in which a clean or flush transaction is sent to the cache containing the selected dirty cache line so that the dirty data stored in the selected cache line gets written to system memory 30. For example, in the case of system cache 26, a clean or flush transaction is provided to system cache 26. In the case of the cache lines being present in other caches, such as cache 14 or cache 18, the clean or flush transaction can be sent to the appropriate cache by either broadcasting the clean or flush transaction or by using the processor indicator of the selected state for cache field of the selected tracking entry to provide the clean or flush transaction to the appropriate processor cache. As discussed above, both a clean and a flush transaction result in the writing of the dirty cache data to system memory 30. However, in the case of a flush transaction, the corresponding cache line is also invalidated, while with a clean, it is not invalidated.

After block 98, flow proceeds to block 100 in which the count field of the selected tracking entry is decremented, and the state for cache line field corresponding to the selected dirty cache line is modified to indicated that it is no longer a candidate for cleaning (since it was just cleaned by way of a flush or clean transaction). Flow then proceeds to block 102 in which cache line clean counter 52 is decremented. Flow proceeds to decision diamond 104 in which it is determined whether cache line clean counter 52 has expired. If not, flow returns to block 96 such that a dirty cache line can again be selected for cleaning using the state for cache line fields of the selected tracking entry. Flow then proceeds as described above. However, if at decision diamond 104, cache line clean counter 52 has expired, flow proceeds to block 106 in which clean in progress indicator 55 is cleared to indicate that a clean is no longer in progress.

Therefore, in one embodiment, note that when block 88 is entered, in which a tracking entry is selected for cleaning, only a single row within system memory 30 needs to be activated to perform all the cleans/flushes as given by blocks 88, 90, 92, 94, 96, 98, 100, 102, 104, and 106. Also note that each iteration through blocks 96, 98, 100, 102, and 104 accesses the same row within system memory 30. Therefore, a number of writes to a particular row within system memory 30 can be performed without needing to continuously close a current row and open a new one. For example, if cache line clean counter is initialized to 8, then a new row may need to be activated and stored into a row buffer of its corresponding bank of system memory 30 for the first access; however, for the subsequent 7 accesses, it is known that the same row is needed, and thus further delay is not incurred in closing and activating different rows for that bank for the series of writes. In this manner, cache lines may be cleaned prior to the time they would be cleaned in accordance with system cache 26's normal cache policy, and delay may be reduced.

Still referring to FIG. 8, after block 106, flow proceeds to decision diamond 107 in which it is determined if the count field of the selected tracking entry has expired. If not, flow proceeds to done. Note that by decrementing the count field (in block 100) with each cache line that is cleaned, it is possible that upon a subsequent check for a tracking entry to clean (such as in block 88), the current tracking entry whose count was decremented may no longer meet the count threshold and may therefore, no longer be a candidate for cleaning. It is also possible that the count has expired, reaching zero. In this case, referring to decision diamond 107, flow proceeds to block 108 in which the selected tracking entry is invalidated since no cache lines corresponding to the tracked region of the selected tracking entry are candidates for cleaning. Flow then proceeds to done.

In an alternate embodiment, the tracking entry may not be invalidated when its tracking entry expires. Instead, an entry may be invalidated when a new entry is allocated, such as in block 70 of FIG. 7. In this case, FIG. 8 would not have decision diamond 107 or block 108. Instead, after block 106, flow would proceed to done.

Note that the flows of FIGS. 7 and 8 may be continuously operating within system 10. That is, the flow of FIG. 7 may occur in response to each access, and the flow of FIG. 8 may occur, for example, upon each clock cycle or each number of clock cycles. Therefore, the flows of FIGS. 7 and 8 may operate in parallel within system 10. In addition, the flows in FIGS. 7 and 8 may not necessarily occur in a single clock cycle. For instance, in FIG. 8, each iteration through block 96, 98, 100, 102, and 104 may occur in a different clock cycle. Furthermore, as described above, system cache 26 may not be present in which cache cleaning circuitry 24 may monitor updates to one or more caches which belong to one or more masters of system 10.

Therefore, by now it can be appreciated how cache cleaning circuitry 24 may be used to track modifications to different regions of system memory 30, such as by tracking dirty cache lines for rows of system memory 30. The tracking of dirty cache lines may be used to determine when a number of dirty cache lines corresponding to a particular region or row can be cleaned. Since this clean flushes or cleans cache lines of a same region of memory, such as a same row of system memory 30, delay may be reduced by reducing the occurrences of row conflicts within the row buffers of system memory 30. For example, since the dirty cache lines being cleaned with a clean process correspond to a same region, continuous closing and opening of new regions is not needed while performing the clean. Therefore, while a delay may be incurred on a first access of a clean process which cleans a set of dirty cache lines corresponding to a same region, subsequent accesses of the clean process do not incur additional delay.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 30 may be located on a same integrated circuit as masters 12 and 14 or on a separate integrated circuit or located within another peripheral or slave discretely separate from other elements of system 10.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, a system cache, such as system cache 26, may not be present. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method including storing a state indicator associated with a cache line, wherein the cache line is one of a plurality of cache lines each associated with a corresponding unique section of a region of system memory, the state indicator includes a dirty indication indicating that the cache line is a candidate for writing data stored in the cache line to the associated section of the region of system memory, and the state indicator is one of a plurality of state indicators each associated with a corresponding cache line; determining, for the region of system memory, a number of the plurality of state indicators that include the dirty indication; and if the determined number of dirty indications exceeds a threshold, then selecting a cache line, writing the data stored in the cache line to the associated section of the region of system memory, and storing a clean indication in the state indicator corresponding to the cache line, wherein the clean indication identifies that the cache line is not a candidate for writing data stored in the cache line to the associated section of the region of system memory. Item 2 include the method of item 1, and further includes performing said selecting the cache line, said writing the data stored in the cache line, and said storing a clean indication for a selected number of cache lines associated with the region of system memory, each of the selected number of cache lines having an associated state indicator including the dirty indication, if the determined number of dirty indications exceeds the threshold. Item 3 includes the method of item 1, wherein said storing the state indicator associated with the cache line further includes storing the state indicator in a tracking entry associated with the region of system memory, wherein the tracking entry includes each of the plurality of state indicators associated with the cache lines associated with the region of system memory. Item 4 includes the method of item 3, and further includes storing the tracking entry in a tracking array, wherein the tracking array includes a plurality of tracking entries, and each of the plurality of tracking entries is associated with a unique region of system memory. Item 5 includes the method of item 4, and further includes performing said determining and said selecting using a cache cleaning control circuitry coupled to a memory storing the tracking array. Item 6 includes the method of item 4, and further includes storing the number of state indicators that include the dirty indication in a counter associated with the tracking entry, wherein said storing is performed for each of the plurality of tracking entries. Item 7 includes the method of item 4, and further includes receiving a memory access message including an access address and one or more attributes associated with the memory access; if no tracking entry matches a region of system memory referred to in the access address, then allocating a new entry in the tracking array, wherein the new entry corresponds to the region of system memory referred to in the access address, if the one or more attributes provide that the memory access message causes a cache line to become a candidate for writing data stored in the cache line to the associated section of the region of system memory; and performing said storing the state indicator associated with the cache line, if the one or more attributes provide that the memory access message causes the cache line to become a candidate for writing data stored in the cache line to the associated section of the region of system memory, wherein the state indicator is stored in one of the new entry in the tracking array or a tracking entry that matches the region of system memory referred to in the access address. Item 8 includes the method of item 7 and further includes storing a clean indication in the state indicator corresponding to the cache line, if the one or more attributes provide that the memory access message indicates an intent to make the cache line become a candidate for writing data stored in the cache line as a result of a subsequent access. Item 9 includes the method of item 8 and further includes incrementing the number of the plurality of state indicators that include the dirty indication for the associated tracking entry, if the one or more attributes provide that the memory access message causes the cache line to become a candidate for writing data stored in the cache line to the associated section of the region of system memory; and decrementing the number of the plurality of state indicators that include the dirty indication for the associated tracking entry, if the one or more attributes provide that the memory access message indicates an intent to make the cache line become a candidate for writing data stored in the cache line as a result of a subsequent access. Item 10 includes the method of item 1, wherein one or more of a system cache memory and processor cache memories, each corresponding to a processor, include the plurality of cache lines.

Item 11 includes a system having one or more masters, each master including one of a processor or a peripheral device; a system memory including a plurality of system memory banks, wherein each system memory bank includes a plurality of unique rows, and each row corresponds to a region of the system memory; one or more cache memories, coupled to the one or more masters, and storing a plurality of cache lines, wherein each cache line is associated with a corresponding unique section of a row of the plurality of rows, each cache line is configured to store data associated with the corresponding unique section of a row for access by the one or more processors, and the one or more cache memories include one or more of a system cache and a dedicated cache associated with a corresponding processor; and a cache cleaning circuitry, coupled to the one or more cache memories, and configured to store a plurality of state indicators each associated with a corresponding cache line of the plurality of cache lines, wherein each state indicator includes one of a dirty indication that the corresponding cache line is a candidate for writing data stored in the cache line to the corresponding unique section of the row or a clean indication that the corresponding cache line is not a candidate for writing data stored in the cache line, select a row having a number of state indicators including the dirty indication exceeding a threshold, and for the selected row, select one or more cache lines each having a corresponding state indicator including the dirty indication, write the data stored in the selected cache lines to the corresponding sections of the row, and store a clean indication in the state indicator. Item 12 includes the system of item 11, wherein the cache cleaning circuitry is further configured to store the state indicator in a tracking entry associated with the row, wherein the tracking entry includes each of the plurality of state indicators associated with the cache lines associated with the row. Item 13 includes the system of item 12, wherein the cache cleaning circuitry further includes a tracking array memory storing a tracking array, wherein the tracking array includes a plurality of tracking entries, and each of the plurality of tracking entries is associated with a unique row. Item 14 includes the system of item 13, wherein the cache cleaning circuitry is further configured to store a number of dirty indications for a tracking entry in a counter associated with the tracking entry. Item 15 includes the system of item 13, wherein the cache cleaning circuitry is further configured to receive a memory access message from a master of the one or more masters, wherein the memory access message includes an access address and one or more attributes associated with the memory access; determine if a tracking entry matches a row referred to in the access address; allocate a new entry in the tracking array corresponding to the row referred to in the access address, if no tracking entry matches the row referred to in the access address, and if the one or more attributes provide that the memory access message causes a cache line to become a candidate for writing data stored in the cache line to the associated section of the row; perform said storing the state indicator associated with the cache line, if the one or more attributes provide that the memory access message causes the cache line to become a candidate for writing data stored in the cache line to the associated section of the row, wherein the state indicator is stored in one of the new entry in the tracking array or a tracking entry that matches the row referred to in the access address; and increment the number of state indicators including the dirty indication for the associated tracking entry, if the one or more attributes provide that the memory access message causes the cache line to become a candidate for writing data stored in the cache line to the associated section of the row. Item 16 includes the system of item 15 wherein the cache cleaning circuitry is further configured to store a clean indication in the state indicator associated with the cache line, if the one or more attributes provide that the memory access message indicates an intent to make the cache line become a candidate for writing data stored in the cache line as a result of a subsequent access; and decrement the number of state indicators including the dirty indication for the associated tracking entry, if the one or more attributes provide that the memory access message indicates an intent to make the cache line become a candidate for writing data stored in the cache line as a result of a subsequent access. Item 17 includes the system of item 12, wherein the tracking entry includes a bit field wherein one or more bits in the bit field stores one of the plurality of state indicators. Item 18 includes the system of item 12, wherein each of the plurality of state indicators includes an identifier of a cache memory storing the associated cache line and the write indication for the associated cache line.

Item 19 includes a method including determining whether one or more tracking entries include a number of dirty indications that exceeds a predetermined threshold, wherein each tracking entry includes a plurality of cache line fields each having a corresponding cache line associated with a unique section of the same region of system memory; selecting a tracking entry of the one or more tracking entries having a number of dirty indications exceeding the predetermined threshold; selecting a dirty cache line associated with the selected tracking entry; transmitting a transaction to a cache storing the selected cache line, wherein the transaction is configured to cause the cache to write the dirty data to a system memory; storing a clean indication in the state indicator corresponding to the selected tracking entry to indicate that the cache line is no longer a candidate for writing data to system memory; and performing said selecting the cache line, transmitting, and storing for a predetermined number of cache lines. Item 20 includes the method of item 19 and further includes storing a count of dirty indications for each tracking entry, wherein the dirty indications correspond to cache lines storing dirty data; and storing a new count of dirty indications for the associated tracking entry subsequent to said transmitting the transaction.

What is claimed is:

1. A method comprising:
    storing a state indicator associated with a cache line wherein the state indicator is stored in a tracking entry associated with a region of system memory, wherein
        the cache line is one of a plurality of cache lines each associated with a corresponding unique section of the region of system memory, wherein the plurality of cache lines includes N cache lines in which N is a number of cache lines needed to store all of the region of system memory,
        the state indicator is one of a plurality of state indicators each associated with a corresponding cache line of the plurality of cache lines such that every cache line of the plurality of cache lines has an associated state indicator of the plurality of state indicators; and
        the tracking entry comprises each of the plurality of state indicators, wherein each state indicator comprises:
            a dirty indication when the associated cache line is a candidate for writing data stored in the cache line to the associated section of the region of system memory, and
            a clean indication when the associated cache line is not a candidate for writing data stored in the cache line to the associated section of the region of system memory,
    determining, for the region of system memory, a number of the plurality of state indicators that comprise the dirty indication; and
    if the determined number of dirty indications exceeds a threshold, then selecting a cache line,
        writing the data stored in the cache line to the associated section of the region of system memory, and
        storing a clean indication in the state indicator corresponding to the cache line, wherein the clean indication identifies that the cache line is not a candidate for writing data stored in the cache line to the associated section of the region of system memory.

2. The method of claim 1 further comprising:
    performing said selecting the cache line, said writing the data stored in the cache line, and said storing a clean indication for a selected number of cache lines associated with the region of system memory, each of the selected number of cache lines having an associated state indicator comprising the dirty indication, if the determined number of dirty indications exceeds the threshold.

3. The method of claim 1 further comprising:
storing the tracking entry in a tracking array, wherein
the tracking array comprises a plurality of tracking entries, and
each of the plurality of tracking entries is associated with a unique region of system memory.

4. The method of claim 3 further comprising:
performing said determining and said selecting using a cache cleaning control circuitry coupled to a memory storing the tracking array.

5. The method of claim 3 further comprising:
storing the number of state indicators that comprise the dirty indication in a counter associated with the tracking entry, wherein
said storing is performed for each of the plurality of tracking entries.

6. The method of claim 3 further comprising:
receiving a memory access message comprising an access address and one or more attributes associated with the memory access;
if no tracking entry matches a region of system memory referred to in the access address, then allocating a new entry in the tracking array, wherein the new entry corresponds to the region of system memory referred to in the access address, if the one or more attributes provide that the memory access message causes a cache line to become a candidate for writing data stored in the cache line to the associated section of the region of system memory; and
performing said storing the state indicator associated with the cache line, if the one or more attributes provide that the memory access message causes the cache line to become a candidate for writing data stored in the cache line to the associated section of the region of system memory, wherein
the state indicator is stored in one of the new entry in the tracking array or a tracking entry that matches the region of system memory referred to in the access address.

7. The method of claim 6 further comprising:
storing a clean indication in the state indicator corresponding to the cache line, if the one or more attributes provide that the memory access message indicates an intent to make the cache line become a candidate for writing data stored in the cache line as a result of a subsequent access.

8. The method of claim 7 further comprising
incrementing the number of the plurality of state indicators that comprise the dirty indication for the associated tracking entry, if the one or more attributes provide that the memory access message causes the cache line to become a candidate for writing data stored in the cache line to the associated section of the region of system memory; and
decrementing the number of the plurality of state indicators that comprise the dirty indication for the associated tracking entry, if the one or more attributes provide that the memory access message indicates an intent to make the cache line become a candidate for writing data stored in the cache line as a result of a subsequent access.

9. The method of claim 1 wherein one or more of a system cache memory and processor cache memories, each corresponding to a processor, comprise the plurality of cache lines.

10. A system comprising:
one or more masters, each master comprising one of a processor or a peripheral device;
a system memory comprising a plurality of system memory banks, wherein
each system memory bank comprises a plurality of unique rows, and
each row corresponds to a region of the system memory;
one or more cache memories, coupled to the one or more masters, and storing a plurality of cache lines, wherein
each cache line is associated with a corresponding unique section of a row of the plurality of rows,
each cache line is configured to store data associated with the corresponding unique section of a row for access by the one or more processors, and
the one or more cache memories comprise one or more of a system cache and a dedicated cache associated with a corresponding processor; and
a cache cleaning circuitry, coupled to the one or more cache memories, and configured to
store a plurality of state indicators each associated with a corresponding cache line of the plurality of cache lines, wherein each state indicator comprises one of a dirty indication that the corresponding cache line is a candidate for writing data stored in the cache line to the corresponding unique section of the row or a clean indication that the corresponding cache line is not a candidate for writing data stored in the cache line,
select a row having a number of state indicators comprising the dirty indication exceeding a threshold, and
for the selected row, select one or more cache lines each having a corresponding state indicator comprising the dirty indication, write the data stored in the selected cache lines to the corresponding sections of the row, and store a clean indication in the state indicator,
wherein the state indicator is stored in a tracking entry associated with the row, wherein the tracking entry comprises N state indicators of the plurality of state indicators associated with the cache lines associated with the row, in which N represents a number of cache lines needed to store all of the row.

11. The system of claim 10 wherein the cache cleaning circuitry further comprises:
a tracking array memory storing a tracking array, wherein
the tracking array comprises a plurality of tracking entries, and
each of the plurality of tracking entries is associated with a unique row.

12. The system of claim 11 wherein the cache cleaning circuitry is further configured to:
store a number of dirty indications for a tracking entry in a counter associated with the tracking entry.

13. The system of claim 11 wherein the cache cleaning circuitry is further configured to:
receive a memory access message from a master of the one or more masters, wherein the memory access message comprises an access address and one or more attributes associated with the memory access;
determine if a tracking entry matches a row referred to in the access address;
allocate a new entry in the tracking array corresponding to the row referred to in the access address,
if no tracking entry matches the row referred to in the access address, and
if the one or more attributes provide that the memory access message causes a cache line to become a candidate for writing data stored in the cache line to the associated section of the row;
perform said storing the state indicator associated with the cache line, if the one or more attributes provide that the memory access message causes the cache line to become a candidate for writing data stored in the cache line to the associated section of the row, wherein the state indicator is stored in one of the new entry in the tracking array or a tracking entry that matches the row referred to in the access address; and increment the number of state indicators comprising the dirty indication for the associated tracking entry, if the one or more attributes provide that the memory access message causes the cache line to become a candidate for writing data stored in the cache line to the associated section of the row.

14. The system of claim 13 wherein the cache cleaning circuitry is further configured to:

store a clean indication in the state indicator associated with the cache line, if the one or more attributes provide that the memory access message indicates an intent to make the cache line become a candidate for writing data stored in the cache line as a result of a subsequent access; and decrement the number of state indicators comprising the dirty indication for the associated tracking entry, if the one or more attributes provide that the memory access message indicates an intent to make the cache line become a candidate for writing data stored in the cache line as a result of a subsequent access.

15. The system of claim 10 wherein the tracking entry comprises a bit field wherein one or more bits in the bit field stores one of the N state indicators.

16. The system of claim 10, wherein each of the plurality of state indicators comprises an identifier of a cache memory storing the associated cache line and the write indication for the associated cache line.

17. The system of claim 10, wherein the cache cleaning circuitry is further configured to:

store a number of dirty indications for a tracking entry in a counter associated with the tracking entry.

18. A method comprising:

determining whether one or more tracking entries comprise a number of dirty indications that exceeds a predetermined threshold, wherein each tracking entry comprises a plurality of cache line fields each having a corresponding cache line associated with a unique section of the same region of system memory, wherein the plurality of cache line fields includes N cache line fields in which N represents a number of cache lines needed to store all of the same region of system memory, and wherein each cache line field comprises:

a dirty indication when the corresponding cache line is a candidate for writing data stored in the cache line to the associated unique section; and a clean indication when the corresponding cache line is not a candidate for writing data stored in the cache line to the associated unique section;

selecting a tracking entry of the one or more tracking entries having a number of dirty indications exceeding the predetermined threshold;

selecting a dirty cache line associated with the selected tracking entry;

transmitting a transaction to a cache storing the selected cache line, wherein the transaction is configured to cause the cache to write the dirty data to a system memory;

storing a clean indication in the state indicator corresponding to the selected tracking entry to indicate that the cache line is no longer a candidate for writing data to system memory;

performing said selecting the cache line, transmitting, and storing for a predetermined number of cache lines;.

storing a count of dirty indications for each tracking entry, wherein the dirty indications correspond to cache lines storing dirty data; and storing a new count of dirty indications for the associated tracking entry subsequent to said transmitting the transaction.

* * * * *